United States Patent
Leinonen et al.

(10) Patent No.: US 9,621,542 B2
(45) Date of Patent: Apr. 11, 2017

(54) IDENTIFICATION FOR APPARATUSES

(75) Inventors: Pekka Eerikki Leinonen, Turku (FI); Rune Adolf Lindholm, Sottunga (FI); Sampo Juhani Sovio, Riihimäki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/390,277

(22) PCT Filed: Apr. 5, 2012

(86) PCT No.: PCT/IB2012/051708
§ 371 (c)(1),
(2), (4) Date: Dec. 28, 2014

(87) PCT Pub. No.: WO2013/150343
PCT Pub. Date: Oct. 10, 2013

(65) Prior Publication Data
US 2015/0312245 A1    Oct. 29, 2015

(51) Int. Cl.
*H04L 29/06* (2006.01)
*G06F 21/73* (2013.01)
*H04W 12/06* (2009.01)
*G06F 21/44* (2013.01)
*G06F 21/81* (2013.01)
*H02J 7/00* (2006.01)

(52) U.S. Cl.
CPC .......... *H04L 63/0823* (2013.01); *G06F 21/44* (2013.01); *G06F 21/73* (2013.01); *G06F 21/81* (2013.01); *H04L 63/0442* (2013.01); *H04L 63/062* (2013.01); *H04W 12/06* (2013.01); *H02J 7/00* (2013.01); *H02J 2007/0001* (2013.01)

(58) Field of Classification Search
CPC ........................... H04L 63/0823; H04L 9/3294
USPC ......................................................... 713/156
See application file for complete search history.

(56) References Cited

U.S. PATENT DOCUMENTS

| | | | |
|---|---|---|---|
| 2001/0029492 A1* | 10/2001 | Uchikata | G06Q 20/382 705/64 |
| 2003/0163700 A1* | 8/2003 | Paatero | H04L 63/0823 713/175 |
| 2005/0010782 A1 | 1/2005 | Ohkubo | |
| 2005/0127868 A1 | 6/2005 | Calhoon et al. | |
| 2006/0204004 A1 | 9/2006 | Shankar et al. | |

(Continued)

FOREIGN PATENT DOCUMENTS

GB    2475612    5/2011

OTHER PUBLICATIONS

Armstrong, "Electronic Controls for Battery Management can ensure Consumer Satisfaction", Sep. 2006, Portable Design, p. 21-22.*

(Continued)

*Primary Examiner* — Thanhnga B Truong
*Assistant Examiner* — Gregory Lane
(74) *Attorney, Agent, or Firm* — Ditthavong & Stiener, P.C.

(57) ABSTRACT

It is inter alia disclosed to provide first identity data stored in an apparatus, the first identity data comprising an identifier and a first certificate, and to provide second identity data stored in the apparatus, the second identity data comprising an identifier and a second certificate, wherein the identifier of the first identity data is the same as the identifier of the second identity data.

17 Claims, 4 Drawing Sheets

(56) References Cited

U.S. PATENT DOCUMENTS

| | | |
|---|---|---|
| 2006/0208850 A1* | 9/2006 | Ikeuchi ............... H02J 7/0004 340/5.8 |
| 2007/0135092 A1 | 6/2007 | Pieronek et al. |
| 2007/0260892 A1 | 11/2007 | Paul et al. |
| 2008/0024268 A1* | 1/2008 | Wong .................. G06F 21/72 340/5.8 |
| 2009/0113543 A1* | 4/2009 | Adams ................ H04L 9/3271 726/18 |
| 2010/0031045 A1* | 2/2010 | Gade .................. G06Q 20/02 713/172 |
| 2010/0033300 A1 | 2/2010 | Brandin |
| 2010/0088519 A1* | 4/2010 | Tsuruoka ............. G06F 21/33 713/176 |
| 2011/0121951 A1 | 5/2011 | Yao |
| 2011/0154043 A1* | 6/2011 | Lim .................... G06F 21/73 713/172 |
| 2014/0094119 A1* | 4/2014 | Stojanovski .......... H04L 5/0055 455/41.1 |
| 2014/0298016 A1* | 10/2014 | Ekberg ............... G06F 21/335 713/168 |

OTHER PUBLICATIONS

"MIPI Alliance Specification for Battery Interface", MIPI Alliance, Version 1.0, Dec. 23, 2011, 102 pages.

Extended European Search Report received for corresponding European Patent Application No. 12873700.4, dated Jul. 22, 2015, 5 pages.

International Search Report and Written Opinion received for corresponding Patent Cooperation Treaty Application No. PCT/IB2012/051708, mailed Dec. 28, 2012, 13 pages.

* cited by examiner

IDENTIFICATION FOR APPARATUSES

RELATED APPLICATION

This application was originally filed as PCT Application No. PCT/IB2012/051708 filed Apr. 5, 2012.

FIELD

Embodiments of this invention relate to identification of apparatuses.

BACKGROUND

The Battery Interface (BIF) standard "MIPI Alliance Specification for Battery Interface Version 1.0" specifies interface between a mobile terminal and a battery pack. This interface represents a "master—multi slave" type of interface. According to BIF standard, every BIF slave shall have an Unique identification number (UID). A UID may be 10-Byte world wide unique number.

The BIF standard also includes a certain minimum requirements for security level for so called BIF Class 2 batteries which are including authentication feature.

But, BIF standard do not mandate UID to be covered by security. For instance, when authentication task is executed, BIF Class 2 battery needs to meet certain requirements for security level, but BIF standard describes UID a just a unique element without enforcing UID to be covered by security features.

SUMMARY OF SOME EMBODIMENTS OF THE INVENTION

Thus, improving security of UID and how to utilize secure UID for improved BIF over all security may be desirable.

According to a first exemplary embodiment of a first aspect of the invention, an apparatus is disclosed, the apparatus comprising first identity data stored in the apparatus, the first identity data comprising an identifier and a first certificate, and second identity data stored in the apparatus, the second identity data comprising an identifier and a second certificate, wherein the identifier of the first identity data is the same as the identifier of the second identity data.

According to a second exemplary embodiment of the first aspect of the invention, a method is disclosed, the method comprising providing first identity data stored in the apparatus, the first identity data comprising an identifier and a first certificate, and providing second identity data stored in the apparatus, the second identity data comprising an identifier and a second certificate, wherein the identifier of the first identity data is the same as the identifier of the second identity data.

According to a third exemplary embodiment of the first aspect of the invention, an apparatus is disclosed, which is configured to perform the method according to the first aspect of the invention, or which comprises means for performing the method according to the first aspect of the invention, i.e. means for providing first identity data stored in the apparatus, the first identity data comprising an identifier and a first certificate, and means for providing second identity data stored in the apparatus, the second identity data comprising an identifier and a second certificate, wherein the identifier of the first identity data is the same as the identifier of the second identity data.

According to a fourth exemplary embodiment of the first aspect of the invention, an apparatus comprises public and private key pair and the first certificate comprises the public key. Signature of the first certificate can be verified by using the public key that is in the second certificate.

According to a fourth exemplary embodiment of the first aspect of the invention, an apparatus is disclosed, comprising at least one processor and at least one memory including computer program code, the at least one memory and the computer program code configured to, with the at least one processor, cause the apparatus at least to perform the method according to the first aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of the first aspect of the invention, a computer program is disclosed, comprising program code for performing the method according to the first aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of the first aspect of the invention, a computer-readable medium is disclosed, having a computer program according to the first aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

The identifier of the first identity data is the same as the identifier of the second identity data. I.e., for instance, the identifier of the first identity data represents a separate identifier compared to the identifier of the second identity data, but the identifier of the first identity data corresponds to (or matches with) the identifier of the first identity data. As an example, the identifier of the first identity data may be equal to the identifier of the second identity data, e.g., if an identifier may be expressed by a value the value of the identifier of the first identity data is identical to the value of the identifier of the second identity data. Thus, the identifier of the first identity data may represent a first identifier and the identifier of the second identity data may represent a second identifier, wherein the first identifier and the second identifier are equal.

For instance, the first identity data may be stored in apparatus in a way that the first identity data is locked in the apparatus, i.e., locking the first identity data may prevent the first identity data from being manipulated. As an example, the first identity data may be stored in a processor or an integrated circuit (IC) of the apparatus during manufacturing process of processor or IC. For instance, the first identity data may be stored by means of hard wiring in processor or in the IC or by means of another well-suited method of locking the first identity data in processor or IC.

Furthermore, for instance, the second identity data may be stored in apparatus in a way that the second identity data is locked in apparatus.

The identifier of the first identity data may represent a unique identifier (UID). Thus, since the identifier of the second identity data is the same as the identifier of the first identity data, the identifier of the second identity data may also represent a UID.

The first certificate may be a certificate being associated with a first party. Thus, for instance, the first certificate may be used to verify that the first identity data is associated with the first party. For instance the identifier of the first identity data may be secured with the first certificate. As an example, the identifier of the first identity data may be part of the first certificate, and, for instance, the first identity data may be considered to represent the first certificate.

Associating the first certificate with the identifier of the first identity data may prevent non-authorized parties from issuing UIDs. Thus, only the first party which holds the first certificate is able to provide an authentic first identity data comprising both the identifier and the correct first certificate. Since the first identity data is locked on the first apparatus 10, it is not possible for a third party to edit the first identity data.

The second certificate may be a certificate being associated with a second party. Thus, for instance, the second certificate may be used to verify that the second identity data is associated with the second party. For instance the identifier of the second identity data may be secured with the second certificate. As an example, the identifier of the second identity data may be part of the second certificate, and, for instance, the second identity data may be considered to represent the second certificate.

Associating the second certificate with the identifier of the second identity data may prevent non-authorized parties from issuing UIDs and from copying the identifier of the first identity data in a valid identifier of the second identity. Thus, only the second party which holds the second certificate is able to provide an authentic first identity data comprising both the identifier and the correct second certificate.

For instance, the first identity data and the second identity data stored in the first apparatus may be used to verify the trustworthiness of the first apparatus.

As an example, the apparatus may for instance be an electronic device that is for instance associated or attached to or part of a battery pack. Thus, the first identity data and the second identity data stored in the first apparatus may be used to verify the trustworthiness of the battery pack.

Furthermore, as an example, one or more further certificate may be stored in apparatus in addition to the first and second certificate. For instance, a third certificate may be associated with the third party, which may represent the manufacturer of the electronic device. This one or more further certificate may also be used for verifying the trustworthiness of the apparatus.

Said verifying the trustworthiness of the apparatus may for instance be performed based on the disclosure presented with respect to the second aspect of the invention discussed below.

According to an exemplary embodiment of the first aspect of the invention, the identifier of the first identity data is a Unique Identifier of a battery pack.

For instance, this Unique Identifier (UID) may represent an UID in accordance with the Battery Interface (BIF) standard "MIPI Alliance Specification for Battery Interface Version 1.0".

According to an exemplary embodiment of the first aspect of the invention, the identifier of the first identity data is part of the first certificate and the identifier of the second identity data is part of the second certificate.

Thus, for instance, the first certificate may be used to verify that the first identity data is associated with the first party.

Associating the first certificate with the identifier of the first identity data may prevent non-authorized parties from issuing UIDs. Thus, only the first party which holds the first certificate is able to provide an authentic first identity data comprising both the identifier and the correct first certificate. Since the first identity data is locked on the first apparatus 10, it is not possible for a third party to edit the first identity data.

The second certificate may be a certificate being associated with a second party. Thus, for instance, the second certificate may be used to verify that the second identity data is associated with the second party.

Associating the second certificate with the identifier of the second identity data may prevent non-authorized parties from issuing UIDs and/or from copying the identifier of the first identity data in a valid identifier of the second identity. Thus, only the second party which holds the second certificate is able to provide an authentic first identity data comprising both the identifier and the correct second certificate.

According to an exemplary embodiment of the first aspect of the invention, the first certificate comprises a first signature.

According to an exemplary embodiment of the first aspect of the invention, the first signature is signed with a private key, and wherein the second identity data comprises a public key associated with this private key.

According to an exemplary embodiment of the first aspect of the invention, the second certificate comprises a second signature.

According to an exemplary embodiment of the first aspect of the invention, the first identity data comprises a public key.

For instance, this public key is associated with a private key being associated with the first party, wherein the first party may represent the processor or IC manufacturer.

According to an exemplary embodiment of the first aspect of the invention, an authentication challenge is received, and an authentication response with respect to the authentication challenge is provided.

According to an exemplary embodiment of the first aspect of the invention, a signature of the authentication challenge is provided, wherein the signature is obtained by signing the authentication challenge by using the private key associated with the public key, wherein the authentication response comprises the signature.

According to an exemplary embodiment of the first aspect of the invention, it is provided at least one of: a signature of the first certificate obtained by signing the first certificate by using the private key associated with the public key, and a signature of the second certificate obtained by signing the second certificate by using the private key associated with the public key.

According to an exemplary embodiment of the first aspect of the invention, the second identity data comprises further data at least related to one of battery pack identification and battery parameters.

For instance, this further data may comprise security critical data.

According to an exemplary embodiment of the first aspect of the invention, the apparatus comprises an integrated circuit, wherein the first identity data is stored in the integrated circuit.

According to an exemplary embodiment of the first aspect of the invention, the first identity data is stored in the integrated circuit during manufacturing of the integrated circuit.

According to an exemplary embodiment of the first aspect of the invention, the second identity data is stored in one of the following: the integrated circuit, and a memory being separated from the integrated circuit.

As an example, the second identity may be stored in a memory and may be locked in the memory or may be stored in processor and may be locked in processor or any other type of IC. E.g., the second identity data may be stored in a non-volatile part of a memory.

According to an exemplary embodiment of the first aspect of the invention, the second identity data is stored during a battery manufacturing process.

According to an exemplary embodiment of the first aspect of the invention, the apparatus is associated with a battery pack.

According to an exemplary embodiment of the first aspect of the invention, the apparatus comprises an interface, and the apparatus is configured to provide the first identity data and the second identity data via the interface.

According to an exemplary embodiment of the first aspect of the invention, the interface represents an interface being compatible with the MIPI BIF battery interface.

This interface may represent the battery interface defined by the Battery Interface (BIF) standard "MIPI Alliance Specification for Battery Interface Version 1.0".

According to a first exemplary embodiment of a second aspect of the invention, a method is disclosed to be performed by an apparatus, comprising verifying trustworthiness of a further apparatus being associated with first identity data and second identity data, the first identity data comprising an identifier and a first certificate and the second identity data comprising an identifier and a second certificate, wherein said verifying trustworthiness is based on verifying at least partially the first identity data and the second identity data which only leads to a positive result if the identifier of the first identity data is the same as the identifier of the second identity data.

According to a second exemplary embodiment of the second aspect of the invention, an apparatus is disclosed, which is configured to perform the method according to the second aspect of the invention, or which comprises means for verifying trustworthiness of a further apparatus being associated with first identity data and second identity data, the first identity data comprising an identifier and a first certificate and the second identity data comprising an identifier and a second certificate, wherein said verifying trustworthiness is based on verifying at least partially the first identity data and the second identity data which only leads to a positive result if the identifier of the first identity data is the same as the identifier of the second identity data.

According to a third exemplary embodiment of the second aspect of the invention, an apparatus is disclosed, comprising at least one processor and at least one memory including computer program code, the at least one memory and the computer program code configured to, with the at least one processor, cause the apparatus at least to perform the method according to the second aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fourth exemplary embodiment of the second aspect of the invention, a computer program is disclosed, comprising program code for performing the method according to the second aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a fifth exemplary embodiment of the second aspect of the invention, a computer-readable medium is disclosed, having a computer program according to the first aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

Said further apparatus may represent any apparatus according to the first aspect of the invention.

Verifying trustworthiness may only lead to a positive result if the identifier of the first identity data is the same as the identifier of the second identity data, since it is known that a trustworthy apparatus according the first aspect of the invention must comprise the same identifier in the first identity data as well as in the second identity data. There may exist a plurality of different embodiments for verifying trustworthiness.

For instance, if an identifier of the second identity data received at the apparatus according to the second aspect of the invention does not match with the identifier of the first identity data received from the apparatus according to the first aspect of the invention, it may be assumed that the second apparatus was manufactured or modified from a non-authorized party.

Furthermore, the first certificate of the first identity data may lead to an increased security in order to protect the identifier of the first identity data and, as an example, further data included in the second identity data, and the second certificate of the second identity data may lead to an increased security in order to protect the identifier of the second identity data and, as an example, further data included in the second identity data.

Thus, for instance, only if verifying trustworthiness leads a positive result, i.e., if the further apparatus is determined to be trustworthy, the further apparatus may be used by the apparatus according to the first aspect for further action.

According to an exemplary embodiment of the second aspect of the invention, said verifying the first identity data comprises at least one of determining whether the identifier of the first identity data is valid, and determining whether the first certificate is valid.

According to an exemplary embodiment of the second aspect of the invention, the first certificate comprises a signature signed with a private key, and the second identity data comprises a public key associated with this private key, and wherein said determining whether the first certificate is valid comprises verifying the signature of the first certificate based on the public key of the second identity data.

According to an exemplary embodiment of the second aspect of the invention, said verifying the second identity data comprises at least one of: determining whether the identifier of the second identity data is valid, and determining whether the second certificate is valid.

According to an exemplary embodiment of the second aspect of the invention, said first identity data comprises a public key, wherein said verifying trustworthiness further comprises: generating an authentication challenge based on the public key configured to be send to the further apparatus, determining whether an authentication response received from the further apparatus in response to the authentication challenge is correct.

According to an exemplary embodiment of the second aspect of the invention, said authentication challenge is generated based on random data.

According to an exemplary embodiment of the second aspect of the invention, the authentication response comprises a signature, and determining whether the authentication response is correct comprises verifying the signature by using the public key.

According to an exemplary embodiment of the second aspect of the invention, the first identity data comprises a public key, and said verifying trustworthiness further comprises at least one of: a signature of the first certificate by using the public key, and a signature of the second certificate by using the public key.

According to an exemplary embodiment of the second aspect of the invention, if said verifying trustworthiness of the further apparatus leads a negative result, storing certain data of at least one of the first and second identity data in a list.

Thus, as an example, a type of black list may be generated comprising data identifying non-trustworthy or third party apparatuses. For instance, if said apparatuses represent or are associated with battery packs or batteries, third party batteries or non-trustworthy batteries may be identified based on this list. For instance, the identifier of the first identity data and/or the identifier of the second identity data may be stored in the list.

According to an exemplary embodiment of a third aspect of the invention, a method is disclosed, the method comprising taking an apparatus comprising first identity data, the first identity data comprising an identifier and a first certificate, and storing second identity data in the apparatus, the second identity data comprising an identifier and a second certificate, wherein the identifier of the first identity data is the same as the identifier of the second identity data.

Thus, the method according to the third aspect of the invention may be used to manufacture the apparatus, wherein one step of manufacturing comprises storing the second identity data in the apparatus, the second identity data comprising an identifier and a second certificate, wherein the identifier of the first identity data is the same as the identifier of the second identity data.

According to an exemplary embodiment of the third aspect of the invention, the apparatus of the second aspect is assembled to a battery pack.

According to an exemplary embodiment of a fourth aspect of the invention, a system is disclosed, the system comprising: an apparatus according to the first aspect of the invention and an apparatus according to the second aspect of the invention or manufactured by the method of the third aspect of the invention.

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1A:
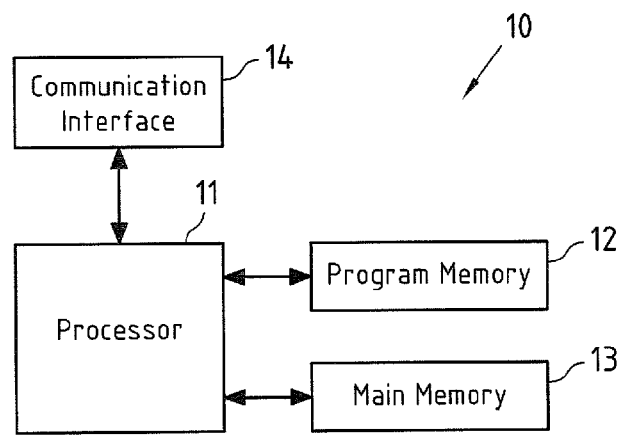
FIG. 1a: A schematic illustration of a first example embodiment of an apparatus according to a first aspect of the invention.

FIG. 1a schematically illustrates components of a first example embodiment of an apparatus 10 according to a first aspect of the invention. Apparatus 10 may for instance be an electronic device that is for instance associated or attached to or part of a battery pack (not depicted in FIG. 1a) and which may be configured to provide authentication of the battery pack. For instance, the battery pack may be configured to be used by a mobile device. Apparatus 10 may for instance be embodied as a module.

Apparatus 10 may for instance comprise first identity data stored in the apparatus, the first identity data comprising an identifier and a first certificate, and may comprise second identity data stored in the apparatus, the second identity data comprising an identifier and a second certificate, wherein the identifier of the first identity data is the same as the identifier of the second identity data.

The identifier of the first identity data is the same as the identifier of the second identity data. I.e., for instance, the identifier of the first identity data represents a separate identifier compared to the identifier of the second identity data, but the identifier of the first identity data corresponds to (or matches with) the identifier of the first identity data. As an example, the identifier of the first identity data may be equal to the identifier of the second identity data, e.g., if an identifier may be expressed by a value the value of the identifier of the first identity data is identical to the value of the identifier of the second identity data. Thus, the identifier of the first identity data may represent a first identifier and the identifier of the second identity data may represent a second identifier, wherein the first identifier and the second identifier are equal.

Apparatus 10 may comprise a processor 11, which may for instance be embodied as a microprocessor, Digital Signal Processor (DSP) or Application Specific Integrated Circuit (ASIC), to name but a few non-limiting examples. Processor 11 may be configured to execute a program code stored in program memory 12 (for instance program code implementing one or more of the embodiments of a method according to the invention described below with reference to FIGS. 2 and 5*b*), and interfaces with a main memory 13. Some or all of memories 12 and 13 may also be included into processor 11. Memories 12 and/or 13 may for instance be embodied as Read-Only Memory (ROM), Random Access Memory (RAM), to name but a few non-limiting examples. One of or both of memories 12 and 13 may be fixedly connected to processor 11 or removable from processor 11, for instance in the form of a memory card or stick.

Processor 11 may further control an optional communication interface 14 configured to receive and/or output information. This communication may for instance be based on a wire-bound or wireless connection. Optional communication interface 14 may thus for instance comprise circuitry such as modulators, filters, mixers, switches and/or one or more antennas to allow transmission and/or reception of signals. For instance, optional communication interface 14 may be configured to allow communication according to or based on the Battery Interface (BIF) standard, e.g. according to "MIPI Alliance Specification for Battery Interface Version 1.0".

For instance, the first identity data may be stored in apparatus 10 in a way that the first identity data is locked in the apparatus 10, i.e., locking the first identity data may prevent the first identity data from being manipulated. As an example, the first identity data may be stored in the processor 11 during manufacturing process of processor 11. For instance, the first identity data may be stored by means of hard wiring in processor 11 or by means of another well-suited method of locking the first identity data in processor 11. Or, as another example, the first identity data may be stored in the main memory 13 and may be locked in the main memory 13. E.g., the first identity data may be stored in a non-volatile part of main memory 13.

Furthermore, for instance, the second identity data may be stored in apparatus 10 in a way that the second identity data is locked in apparatus 10. As an example, the second identity may be stored in the main memory 13 and may be locked in the main memory or may be stored in processor 11 and may be locked in processor 11. E.g., the second identity data may be stored in a non-volatile part of main memory 13. As an example, the second identity data may be stored in apparatus 10 during battery manufacturing process, wherein this battery manufacturing process may be performed with respect to a mobile device manufacturing process.

Figure 1B:
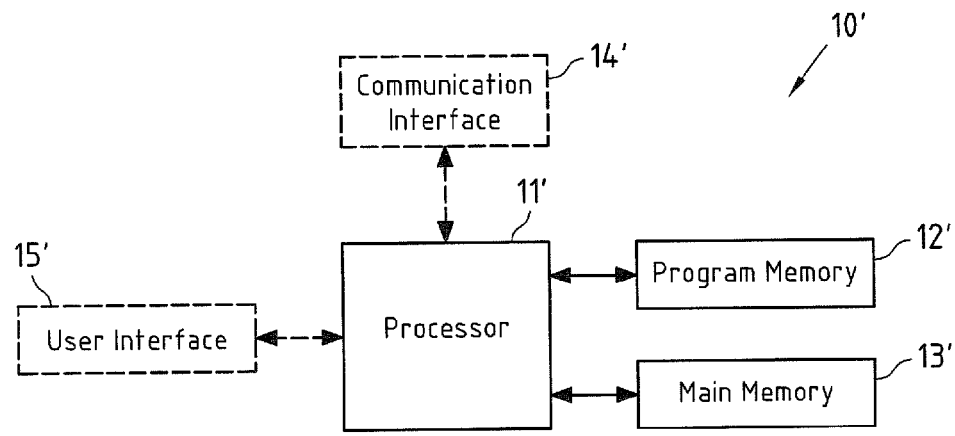
FIG. 1b: a schematic illustration of first example embodiment of an apparatus according to a second aspect of the invention.

FIG. 1*b* schematically illustrates components of a first example embodiment of an apparatus 10' according to a second aspect of the invention. Apparatus 10' may for instance be a mobile device or a part of a mobile device that may be configured to be connected to battery pack for power supply. For instance, the mobile device may represent a mobile phone, a smartphone, or a personal digital assistant, or a computer (e.g. a laptop or desktop computer), or any other type of mobile device. Apparatus 10' may for instance be embodied as a module.

Apparatus 10' may for instance be configured to verify trustworthiness of a another apparatus 10' being associated with first identity data and second identity data, the first identity data comprising an identifier and a first certificate and the second identity data comprising an identifier and a second certificate, wherein said verifying trustworthiness is based on verifying at least partially the first identity data and the second identity data which only leads to a positive result if the identifier of the first identity data is the same as the identifier of the second identity data.

Apparatus 10' may comprise a processor 11', which may for instance be embodied as a microprocessor, Digital Signal Processor (DSP) or Application Specific Integrated Circuit (ASIC), to name but a few non-limiting examples. Processor 11' may be configured to execute a program code stored in program memory 12 (for instance program code implementing one or more of the embodiments of a method according to the invention described below with reference to FIGS. 3, 4 and 5*a*), and interfaces with a main memory 13'. Some or all of memories 12' and 13' may also be included into processor 11'.

Memories 12' and/or 13' may for instance be embodied as Read-Only Memory (ROM), Random Access Memory (RAM), to name but a few non-limiting examples. One of or both of memories 12' and 13' may be fixedly connected to processor 11' or removable from processor 11', for instance in the form of a memory card or stick.

Processor 11' may further control an optional communication interface 14' configured to receive and/or output information. This communication may for instance be based on a wire-bound or wireless connection. Optional communication interface 14' may thus for instance comprise circuitry such as modulators, filters, mixers, switches and/or one or more antennas to allow transmission and/or reception of signals. For instance, optional communication interface 14' may be configured to allow communication according to or based on the Battery Interface (BIF) standard, e.g. according to "MIPI Alliance Specification for Battery Interface Version 1.0".

Apparatus 10' of FIG. 1*b* may further comprise components such as a user interface, for instance to allow a user of apparatus 1 to interact with processor 10, or an antenna with associated radio frequency (RF) circuitry to enable apparatus 1 to perform wireless communication.

It is to be noted that the circuitry formed by the components of apparatus 10 or apparatus 10' may be implemented in hardware alone, partially in hardware and in software, or in software only, as further described at the end of this specification.

Figure 1C:
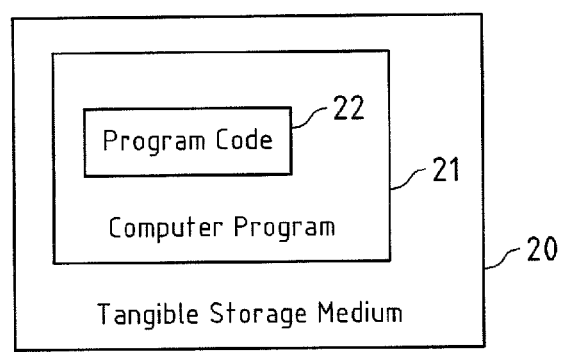
FIG. 1c: a tangible storage medium according to an embodiment of the invention.

FIG. 1*c* is a schematic illustration of an embodiment of a tangible storage medium 20 according to the invention. This tangible storage medium 20, which may in particular be a non-transitory storage medium, comprises a program 21, which in turn comprises program code 22 (for instance a set of instructions). Realizations of tangible storage medium 20 may for instance be program memory 12 of FIG. 1*a* or program memory 12' of FIG. 1*b*. Consequently, program code 22 may for instance implement the flowcharts of FIGS. 2, 3, 4, 5*a* and 5*b* discussed below.

Figure 2:
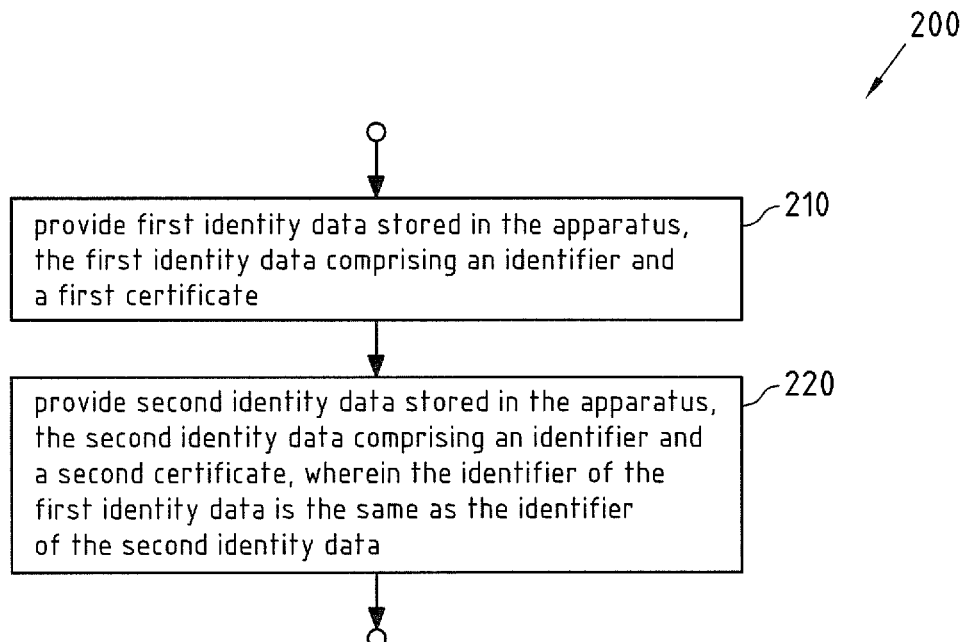
FIG. 2: a flowchart of a first example embodiment of a method according to a first aspect of the invention.

FIG. 2 shows a flowchart 200 of a first example embodiment of a method 200 according to a first aspect of the invention. The steps of this flowchart 200 may for instance be defined by respective program code 22 of a computer program 21 that is stored on a tangible storage medium 20, as shown in FIG. 1c. Tangible storage medium 20 may for instance embody program memory 11 of FIG. 1a, and the computer program 31 may then be executed by processor 10 of FIG. 1a. Thus, the method 200 may be performed by apparatus 10 according to a first aspect of the invention, wherein this apparatus 10 may be denoted as first apparatus 10 in the sequel.

This method 200 will be explained in conjunction with flowchart 300 of a first example embodiment of a method 300 according to a second aspect of the invention depicted in FIG. 3. The steps of this flowchart 300 may for instance be defined by respective program code 22 of a computer program 21 that is stored on a tangible storage medium 20, as shown in FIG. 1c. Tangible storage medium 20 may for instance embody program memory 11' of FIG. 1b, and the computer program 31 may then be executed by processor 10' of FIG. 1b. Thus, the method 300 may be performed by apparatus 10' according to a second aspect of the invention, wherein this apparatus 10' may be denoted as second apparatus 10' in the sequel.

Returning to FIG. 2, in a step 210 the method 200' comprises providing first identity data stored in first apparatus 10, the first identity data comprising an identifier and a first certificate, and in a step 220 the method 200' comprises providing second identity data stored in the first apparatus 10, the second identity data comprising an identifier and a second certificate, wherein the identifier of the first identity data is the same as the identifier of the second identity data.

For instance, the first identity data and the second identity data may be provided via communication interface 14 to a further apparatus, wherein this further apparatus may represent the second apparatus 10'.

The identifier of the first identity data may represent a unique identifier (UID). Thus, since the identifier of the second identity data is the same as the identifier of the first identity data, the identifier of the second identity data may also represent a UID.

The first certificate may be a certificate being associated with a first party. Thus, for instance, the first certificate may be used to verify that the first identity data is associated with the first party. For instance the identifier of the first identity data may be secured with the first certificate. As an example, the identifier of the first identity data may be part of the first certificate, and, for instance, the first identity data may be considered to represent the first certificate.

Associating the first certificate with the identifier of the first identity data may prevent non-authorized parties from issuing UIDs. Thus, only the first party which holds the first certificate is able to provide an authentic first identity data comprising both the identifier and the correct first certificate. Since the first identity data is locked on the first apparatus 10, it is not possible for a third party to edit the first identity data.

The second certificate may be a certificate being associated with a second party. Thus, for instance, the second certificate may be used to verify that the second identity data is associated with the second party. For instance the identifier of the second identity data may be secured with the second certificate. As an example, the identifier of the second identity data may be part of the second certificate, and, for instance, the second identity data may be considered to represent the second certificate.

Associating the second certificate with the identifier of the second identity data may prevent non-authorized parties from issuing UIDs and from copying the identifier of the first identity data in a valid identifier of the second identity. Thus, only the second party which holds the second certificate is able to provide an authentic first identity data comprising both the identifier and the correct second certificate.

For instance, the first identity data and the second identity data stored in the first apparatus 10 may be used to verify the trustworthiness of the first apparatus 10.

As an example, the first apparatus 10 may for instance be an electronic device that is for instance associated or attached to or part of a battery pack. Thus, the first identity data and the second identity data stored in the first apparatus 10 may be used to verify the trustworthiness of the battery pack.

Furthermore, as an example, one or more further certificate may be stored in apparatus 10 in addition to the first and second certificate. For instance, a third certificate may be associated with the third party, which may represent the manufacturer of the electronic device. This one or more further certificate may also be used for verifying the trustworthiness of the first apparatus 10.

Figure 3:
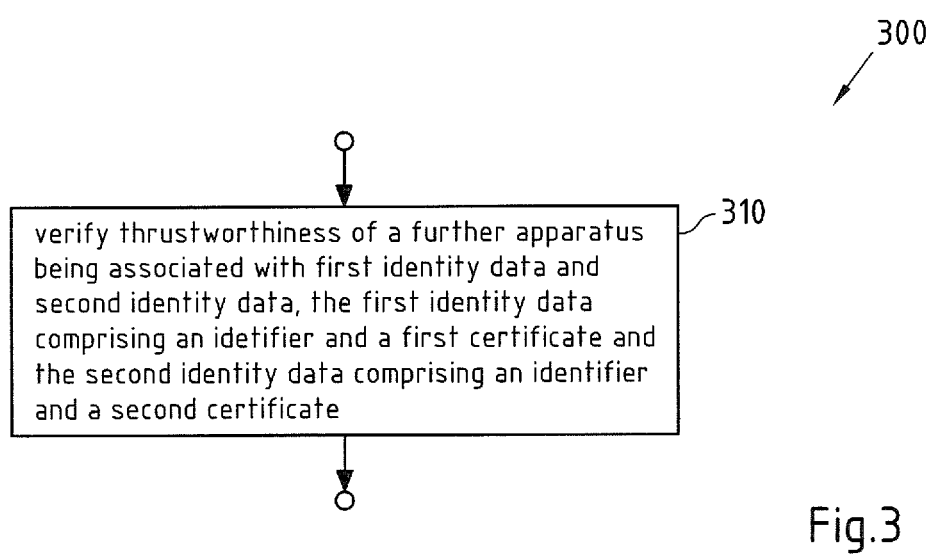
FIG. 3: a flowchart of a first example embodiment of a method according to a second aspect of the invention.

Said verifying the trustworthiness of the first apparatus 10 may for instance be performed by method 300 depicted in FIG. 3.

In a step 310 the method 300 comprises verifying trustworthiness of a further apparatus (e.g. the first apparatus 10) being associated with first identity data and second identity data, the first identity data comprising an identifier and a first certificate and the second identity data comprising an identifier and a second certificate, wherein said verifying trustworthiness is based on verifying at least partially the first identity data and the second identity data which only leads to a positive result if the identifier of the first identity data is the same as the identifier of the second identity data.

For instance, the communication interface 14' of second apparatus 10' may be connected to the communication interface 14 of first apparatus 10, and the second apparatus 10' may be configured to receive the first identity data and the second identity data from the first apparatus 10 via its communication interface 14'.

Verifying trustworthiness only leads to a positive result if the identifier of the first identity data is the same as the identifier of the second identity data, since it is known that a trustworthy apparatus 10' must comprise the same identifier in the first identity data as well as in the second identity data. There may exist a plurality of different embodiments for verifying trustworthiness.

For instance, if the identifier of the second identity data received at the second apparatus 10' does not match with the identifier of the first identity data, it may be assumed that the battery pack was manufactured from a non-authorized party. In particular, this may hold if the first identity data is locked in the first apparatus 10, e.g. by means of storing the first identity data in the processor 11 or in another integrated circuit (IC) of apparatus 10 during manufacturing the processor or the IC by a first party, which may represent the processor or IC manufacturer.

For instance, a non-authorized battery manufacturer may receive apparatus 10 or a part of apparatus 10, e.g., at least the processor 11 or the IC, from the processor or IC manufacturer, and wants to manufacture a fake battery pack comprising the apparatus 10. Then, the non-authorized battery manufacturer is bound the identifier of the first identity data since it is already locked in the apparatus 10.

Accordingly, the identifier of the first identity data prevents non-authorized parties from issuing identifiers, since this identifier locked in the first apparatus 10 constitutes the identifier to be used for authorization of the apparatus 10.

Furthermore, the first certificate of the first identity data may lead to an increased security in order to protect the identifier of the first identity data and, as an example, further data included in the second identity data, and the second certificate of the second identity data may lead to an increased security in order to protect the identifier of the second identity data and, as an example, further data included in the second identity data.

Thus, for instance, only if verifying trustworthiness leads a positive result, i.e., if the first apparatus 10 is determined to be trustworthy, the first apparatus may be used by the second apparatus for further action. For instance, if the apparatus 10 is associated with or a part of a battery pack, the second apparatus 10' may only maintain or initiate power connect to the battery pack, e.g. in order to receive power from the battery pack and/or to charge the battery pack, if verifying trustworthiness leas a positive result. Otherwise, the second apparatus 10' may disconnect power connect to the battery pack or may not initiate a power connect to the battery pack.

Figure 4:
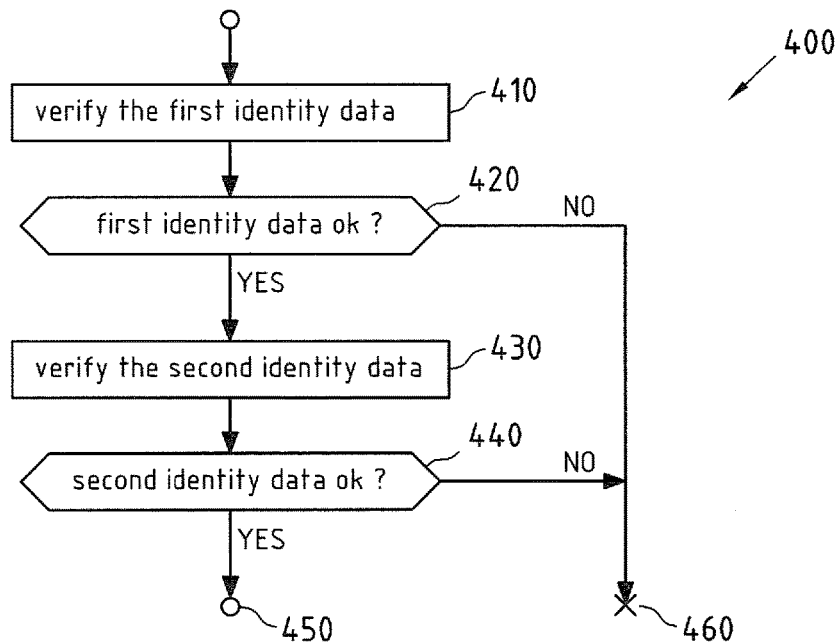
FIG. 4: a flowchart of a second example embodiment of a method according to a second aspect of the invention.

FIG. 4 depicts a flowchart of a second example embodiment of a method according to a second aspect of the invention. The steps of this flowchart 400 may for instance be defined by respective program code 22 of a computer program 21 that is stored on a tangible storage medium 20, as shown in FIG. 1c. Tangible storage medium 20 may for instance embody program memory 11' of FIG. 1b, and the computer program 31 may then be executed by processor 10' of FIG. 1b. Thus, the method 400 may be performed by the second apparatus 10'.

For instance, this method 400 may be used for verifying trustworthiness of the first apparatus 10 as exemplarily depicted in FIG. 3.

In a step 410 the method 400 comprises verifying the first identity data.

As an example, verifying the first identity data in step 410 may comprise at least one of determining whether the identifier of the first identity data is valid and determining whether the first certificate is valid.

For instance, for determining whether the identifier of the first identity data is valid it may be checked whether the identifier of the first identity data matches with an originally issued identifier. As an example, second apparatus 10' may comprise a list of originally issued identifiers. If the identifier of the first identity data matches with an identifier of this list, the identifier of the first identity data may be assumed to be valid.

Furthermore, for determining whether the first certificate is valid it may be checked whether the first certificate represents a valid certificate associated with a trusted first party. As an example, the first certificate may comprise a signature, wherein this signature is associated with a first party. Thus, only if the signature of the first certificate represents a valid signature associated with a trusted first party, the first certificate may represent a valid certificate. As a non-limiting example, it has to be understood that the identifier of the first identity data may be secured with the certificate, wherein the identifier of the first identity data may be a part of the first certificate. Accordingly, as an example, verifying the first identity data may only lead to a positive result when the first certificate is determined to be valid.

Furthermore, as an example, the signature of the first certificate may be signed with a private key and the second identity data comprises a public key associated with this private key. For instance, the private key may be associated with the first apparatus 10. Then, as an example, said determining whether the first certificate is valid may comprise verifying the signature of the first certificate based on the public key of the second identity data. Accordingly, the second certificate can be used for verifying the first certificate, since the first certificate comprises the public key to be used for verifying the signature of the first certificate. Thus, the first certificate and the second certificate may be cryptographically bound to each other.

If said verifying the first identity data performed in step 410 leads to a positive result it is determined that the first identity data is ok in step 420, and the method 400 may proceed with verifying the second identity data in step 430. If said verifying the first identity data performed in step 410 leads to a negative result it is determined that the first identity data is not ok in step 420, and the method 400 may proceed with stopping the verification procedure (indicated by reference sign 460) since this means that the first apparatus 10 is determined not to be trustworthy.

As an example, verifying the second identity data in step 430 may comprise at least one of determining whether the identifier of the second identity data is valid and determining whether the second certificate is valid.

For instance, for determining whether the identifier of the second identity data is valid it may be checked whether the identifier of the second identity data matches with an originally issued identifier. As an example, apparatus 10' may comprise a list of originally issued identifiers. If the identifier of the second identity data matches with an identifier of this list, the identifier of the second identity data may be assumed to be valid. Or, as an example, it may be determined whether the identifier of the second identity data matches with the identifier of the first identity data, if the identifier of the first identity data has been positively verified in steps 410 and 420.

Furthermore, for determining whether the second certificate is valid it may be checked whether the second certificate represents a valid certificate associated with a trusted second party. As an example, the second certificate may comprise a signature, wherein this signature is associated with a second party. Thus, only if the signature of the second certificate represents a valid signature associated with a trusted second party, the second certificate may represent a valid certificate. As a non-limiting example, it has to be understood that the identifier of the second identity data may be secured with the certificate, wherein the identifier of the second identity data may be a part of the second certificate. Accordingly, as an example, verifying the second identity data may only lead to a positive result when the second certificate is determined to be valid.

If said verifying the second identity data performed in step 430 leads to a positive result it is determined that the second identity data is ok in step 430. In case that there are no further requirements rules to be checked for verifying trustworthiness of the second apparatus 10', it may be determined that the apparatus 10 is trustworthiness at reference sign 450. Otherwise, if there are further requirements or rules to be checked for verifying trustworthiness of the second apparatus 10', the method may proceed with checking these other requirements or rules at reference sign 450.

If said verifying the first identity data performed in step 430 leads to a negative result it is determined that the first identity data is not ok in step 440, and the method 400 may proceed with stopping the verification procedure (indicated by reference sign 460) since this means that the first apparatus 10 is determined not to be trustworthy.

Figure 5A:
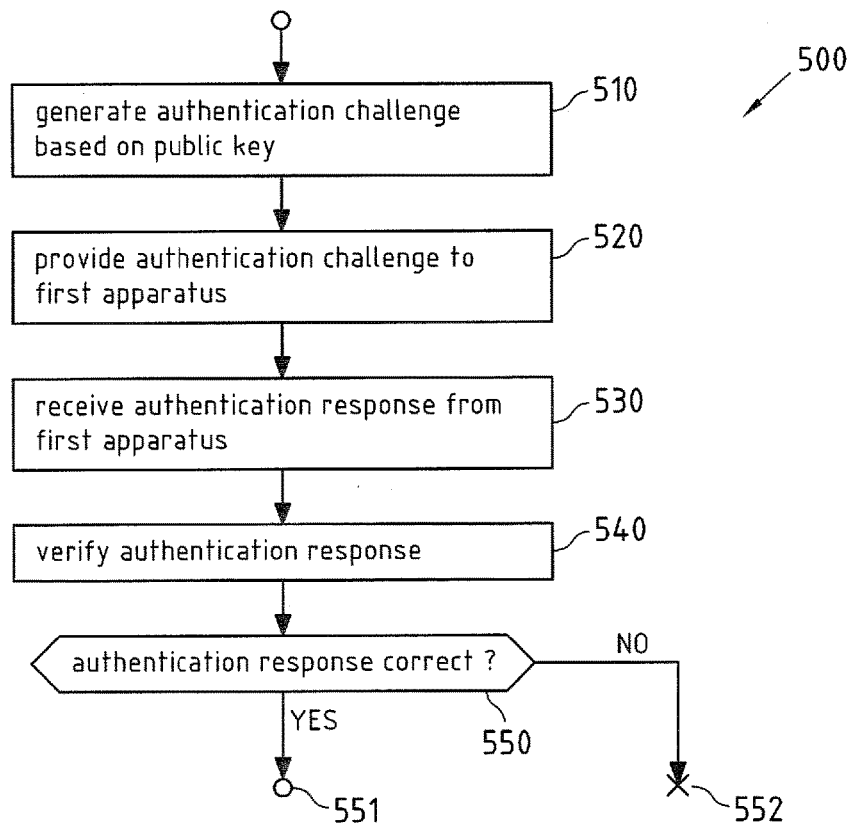
FIG. 5a: a flowchart of a third example embodiment of a method according to a second aspect of the invention.

FIG. 5a depicts a flowchart 500 of a third example embodiment of a method 500 according to a second aspect of the invention. The steps of this flowchart 500 may for instance be defined by respective program code 22 of a computer program 21 that is stored on a tangible storage medium 20, as shown in FIG. 1c. Tangible storage medium 20 may for instance embody program memory 11' of FIG. 1b, and the computer program 31 may then be executed by processor 10' of FIG. 1b. Thus, the method 500 may be performed by the second apparatus 10'.

For instance, this method 500 may be used to check whether a further requirement is met for verifying trustworthiness of the first apparatus 10. Thus, this method 500 may be part of method 300 depicted in FIG. 3 and/or part of method 400 depicted in FIG. 4.

This additional verification of trustworthiness of the first apparatus 10 may be performed based on a public key, as will be exemplarily described with respect to method 500.

For instance, this public key is associated with a private key being associated with the first party, wherein the first party may represent the processor or IC manufacturer, as mentioned above.

As an example, it may be assumed that the first identity data comprises the public key. Accordingly, the second apparatus 10' may receive this public key when receiving the first identity data from the first apparatus 10.

This method 500 will be explained in conjunction with flowchart 500' of a second example embodiment of a method 500' according to a second aspect of the invention depicted in FIG. 5a. The steps of this flowchart 500' may for instance be defined by respective program code 22 of a computer program 21 that is stored on a tangible storage medium 20, as shown in FIG. 1c. Tangible storage medium 20 may for instance embody program memory 11 of FIG. 1a, and the computer program 31 may then be executed by processor 10 of FIG. 1a. Thus, the method 500 may be performed by the first apparatus 10.

In a step 510 of method 500, the second apparatus 10' may an authentication challenge based on the public key. For instance, this authentication challenge may represent data encrypted by using the public key. The public key may represent a key of a cryptography scheme, which applies a public key, which is provided by the first apparatus 10 within the first identity data, and a private key which is stored in the first apparatus 10 and which is not made public. As an example, the public key may be part of the first certificate.

For instance, the authentication challenge may be generated based on random data. As an example, the random data may be encrypted by the public key in order to generated the authentication challenge.

In a step 520, this authentication challenge is provided by the second apparatus 10' to the first apparatus 10. For instance, this may be performed via the communication interface 14' of the second apparatus 10'.

In a step 560 of method 500', the first apparatus 10 receives this authentication challenge from the second apparatus 10'. In a step 570, the first apparatus 10 provides an authentication response with respect to the authentication challenge based on the provide key stored in the first apparatus 10. For instance, this may be performed via the communication interface 14 of the first apparatus 10. Thus, only if the first apparatus 10 is aware of the correct private key, a correct authentication response can be generated with respect to the authentication challenge received from the second apparatus 10'.

For instance, the first apparatus 10 may encrypt the authentication challenge by using the private key, and the authentication response may comprise the decrypted authentication challenge.

Furthermore, as another example, the first apparatus 10 may generate a signature of the authentication challenge by signing the authentication challenge by using the private key being associated with the public key. Then, for instance, the authentication response provided in step 570 may comprise this signature.

In a step 530, the second apparatus 10' receives the authentication response from the first apparatus 10, and in a step 540, the second apparatus 10' verifies the received authentication response.

For instance, in step 540 the second apparatus 10' may check whether the authentication response corresponds to non-encrypted random data, which may was used for generating encrypted data based on the public key in step 510 for generating the authentication challenge.

Or, as another example, if the authentication response comprises the signature of the authentication challenge, the second apparatus 10' may check the signature based on the public key in step 510.

Thus, only if the authentication response is correct, the additional verification of trustworthiness of the first apparatus 10 leads to a positive result and the method 500 may proceed at reference sign 551. Otherwise, if it is determined in step 550 that the authentication response is not correct, the method 500 may proceed with stopping the verification procedure (indicated by reference sign 52) since this means that the apparatus 10' is determined not to be trustworthy.

Accordingly, the exemplary additional verification of trustworthiness of the first apparatus 10 based on a public key may lead to a further increase of security.

Figure 5B:
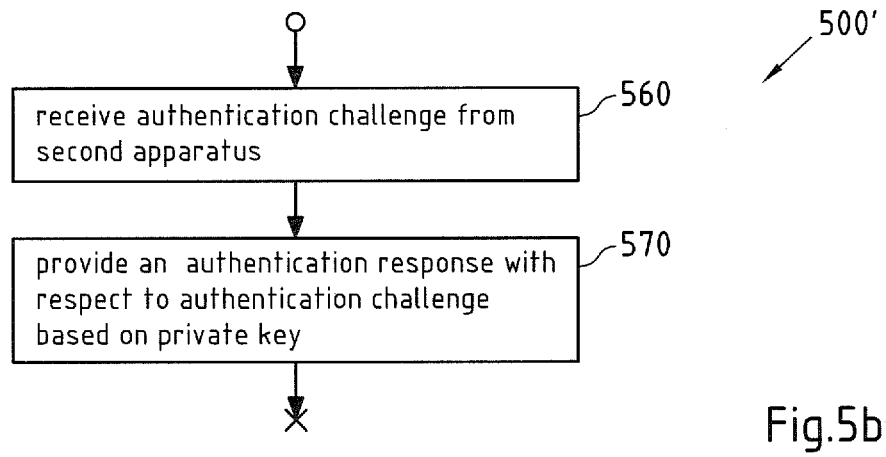
FIG. 5b: a flowchart of a second example embodiment of a method according to a first aspect of the invention.

For instance, the public key and the private key use with respect to the methods 500 and 500' depicted in FIGS. 5a and 5b may differ from the public key optionally included in the second identity data and the respective private key for generating the optional signature included in the certificate of the first identity data.

Figure 6:
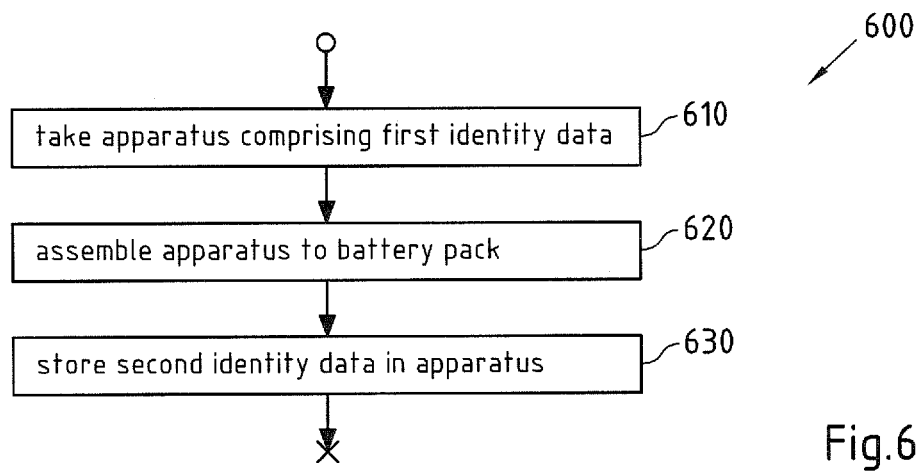
FIG. 6: a flowchart of a first example embodiment of a method according to a third aspect of the invention.

FIG. 6 depicts a flowchart of a first example embodiment of a method according to a third aspect of the invention.

This third aspect of the invention is directed to a manufacturing process which may be performed by the second party mentioned above.

This second party receives an apparatus from a first party, wherein the first identity data at least comprising the identifier and the first certificate is stored in the apparatus as described with respect to the first aspect to the invention. Thus, the first identity data may be stored in the apparatus in a way that the first identity data is locked in the apparatus, i.e., locking the first identity data may prevent the first identity data from being manipulated.

For instance, the first party may represent an IC manufacturer, and the As an example, the first identity data may be stored in a processor or any IC during manufacturing process of the processor or the IC. For instance, the first identity data may be stored by means of hard wiring in processor or in the IC or by means of another well-suited method of locking the first identity data in processor or the IC. Or, as another example, the first identity data may be stored in a memory and may be locked in the main memory by the first party. E.g., the first identity data may be stored in a non-volatile part of memory.

Accordingly, in a step 610, the second party takes the apparatus comprising the first identity data, wherein the apparatus may comprise at least the above mentioned processor or IC or memory.

In a step 620, the apparatus may be assembled to a battery pack. This assembling may comprise integrating the apparatus in a battery pack or attaching the apparatus in a battery pack.

Then, in a step 630, the second party stores the second identity data in the apparatus, wherein the second certificate in the second identity data may be associated with the second party in order to secure the second identity data. For instance, the second party may represent a battery pack manufacturer.

For instance, the second identity data may be stored in the apparatus in a way that the second identity data is locked in apparatus 10, as mentioned with respect to the first aspect of the invention. As an example, the second identity may be stored in a memory of the apparatus and may be locked in the memory. E.g., the second identity data may be stored in a non-volatile part of the memory, or the second identity data may be stored in the processor or in the IC. As an example, the second identity data may be stored in apparatus during battery manufacturing process, wherein this battery manufacturing process may be performed with respect to a mobile device manufacturing process.

As an example, the second identity data may comprises further data at least related to one of battery pack identification and battery parameters.

For instance, after step 630 has been performed, the apparatus manufactured by means of method 600 may represent at least partially the first apparatus 10 depicted in FIG. 1a and explained with respect to exemplary embodiments the first aspect of the invention.

Accordingly, the apparatus is associated with the batter pack and can be used to provide trustworthiness based on the first and second identity data stored in the apparatus.

Figure 7:
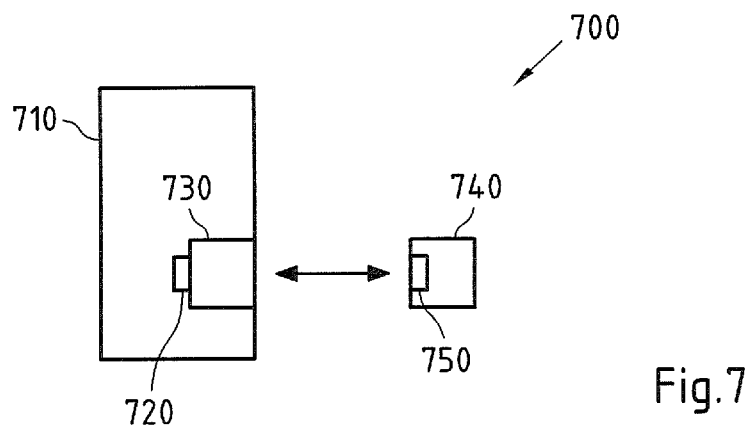
FIG. 7: an example of an embodiment of a system according to a fourth aspect of the invention.

FIG. 7 depicts an example of an embodiment of a system 700 according to a fourth aspect of the invention.

This system 700 comprises an apparatus 750, which may correspond to the first apparatus described above with respect to the first aspect of the invention, wherein this apparatus 750 may be assembled to a battery pack 740. Thus, apparatus 750 may represent apparatus 10 depicted in FIG. 1a.

The system 700 further comprises an apparatus 720, which may correspond to the second apparatus described above with respect to the second aspect of the invention. Thus, apparatus 720 may represent apparatus 10' depicted in FIG. 1b. The apparatus 720 may be part of an electronic device 710, wherein this electronic device 710 may comprises means 730 for receiving the battery pack 750. Thus, the battery pack 750 comprising the apparatus 750 may be put in the means 730 for receiving the battery pack of the electronic device 710, and afterwards the apparatus 720 may verify trustworthiness of the apparatus 720 as described above.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor (s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. It should also be understood that the sequence of method steps in the flowcharts presented above is not mandatory, also alternative sequences may be possible. Furthermore, it has to be under stood that for example one or more further certificate may be stored in the first apparatus 10 in addition to the first and second certificate.

The invention has been described above by non-limiting examples. In particular, it should be noted that there are alternative ways and variations which are obvious to a skilled person in the art and can be implemented without deviating from the scope and spirit of the appended claims.

The invention claimed is:
1. An apparatus, comprising:
at least one processor;
at least one memory including computer program code for one or more programs,
the at least one memory including
first identity data including a first identifier and a first certificate, wherein the first identity data comprises a public key,
second identity data including a second identifier and a second certificate,
wherein the second identity data is associated with an external source associated with utilizing the apparatus to verify a battery pack; and
a communication interface configured to:
facilitate verifying the first identifier is associated with the second identifier, wherein the first identifier is equivalent to the second identifier,
receive an authentication challenge and to provide an authentication response with respect to the authentication challenge based on a private key associated with the public key, and
provide a signature of the authentication challenge obtained by signing the authentication challenge by using the private key associated with the public key, wherein the authentication response comprises the signature.

2. An apparatus according to claim 1, wherein the first identifier is a unique identifier associated with the battery pack,
wherein the communication interface is further configured to utilize a battery interface standard to facilitate verifying the first identifier and the second identifier are equivalent,
wherein the first identifier is locked with the apparatus,
wherein the apparatus is incorporated into the battery pack.

3. The apparatus according to claim 1, wherein
the first identifier is part of the first certificate and wherein the second identifier is part of the second certificate.

4. The apparatus according to claim 1, wherein the first certificate comprises a first signature.

5. The apparatus according to claim 4, wherein the first signature is signed with a private key, and wherein the second identity data comprises a public key associated with this private key.

6. The apparatus according to claim 1, wherein the second certificate comprises a second signature.

7. The apparatus according to claim 1, configured to provide at least one of:
a signature of the first certificate obtained by signing the first certificate by using the private key associated with the public key, and
a signature of the second certificate obtained by signing the second certificate by using the private key associated with the public key.

8. A method performed by an apparatus, including a processor, comprising:
providing first identity data stored in the apparatus, the first identity data including a first identifier and a first certificate, wherein the first identity data comprises a public key;
providing second identity data stored in the apparatus, the second identity data including a second identifier and a second certificate,
wherein the second identity data is associated with an external source associated with utilizing the apparatus to verify a battery pack;
verifying, utilizing the processor, the first identifier is equivalent to the second identifier via a communication interface configured to verify the first identifier is associated with the second identifier,
wherein the first identifier is equivalent to the second identifier;
receiving an authentication challenge including challenge data and providing an authentication response to the authentication challenge based on the verification;
receive an authentication challenge and to provide an authentication response with respect to the authentication challenge based on a private key associated with the public key, and
provide a signature of the authentication challenge obtained by signing the authentication challenge by using the private key associated with the public key, wherein the authentication response comprises the signature.

9. The method according to claim 8, wherein the first identifier is a unique identifier associated with the battery pack,
wherein the communication interface is further configured to utilize a battery interface standard to facilitate verifying the first identifier and the second identifier are equivalent,
wherein the first identifier is locked in the apparatus,
wherein the apparatus is incorporated into the battery pack.

10. The method according to claim 8, wherein said providing the first identity data comprises transmitting the first identity data to a further apparatus and wherein said providing the second identity data comprises transmitting the second identity data to the second apparatus.

11. The method according to claim 8, wherein the first identifier is part of the first certificate and wherein the second identifier is part of the second certificate.

12. The method according to claim 8, wherein the first certificate comprises a first signature.

13. The method according to claim 8, wherein the first signature is signed with a private key, and wherein the second identity data comprises a public key associated with this private key.

14. The method according to claim 8, wherein the second certificate comprises a second signature.

15. The method according to claim 8, wherein the first identity data comprises a public key.

16. A computer program product comprising a least one computer readable non-transitory memory medium having program code stored thereon, the program code which when executed by an apparatus, including a processor, cause the apparatus at least to:
process first identity data stored in the apparatus, the first identity data including a first identifier and a first certificate, wherein the first identity data comprises a public key;
process second identity data stored in the apparatus, the second identity data including a second identifier and a second certificate,
wherein the second identity data is associated with an external source associated with utilizing the apparatus;
verify, utilizing the processor, the first identifier is associated with the second identifier via a communication interface configured to facilitate verifying the first identifier is associated with the second identifier,
wherein the first identifier is equivalent to the second identifier;
receive an authentication challenge including challenge data and provide an authentication response to the authentication challenge based on the verification;
receive an authentication challenge and to provide an authentication response with respect to the authentication challenge based on a private key associated with the public key, and
provide a signature of the authentication challenge obtained by signing the authentication challenge by using the private key associated with the public key, wherein the authentication response comprises the signature.

17. A computer program product according to claim 16, wherein the first identifier is a unique identifier associated with the battery pack,
wherein the communication interface is further configured to utilize a battery interface standard to facilitate verifying the first identifier and the second identifier are equivalent,
wherein the first identifier is locked with the apparatus,
wherein the apparatus is incorporated into the battery pack.

* * * * *